US006598518B2

(12) United States Patent
Wong

(10) Patent No.: US 6,598,518 B2
(45) Date of Patent: Jul. 29, 2003

(54) FOOD PROCESSING DEVICE

(76) Inventor: Yan Kwong Wong, Unit 1016-17, 10/F, Metro Centre II, 21 Lam Hing Street, Kowloon Bay, Kowloon (HK)

(*) Notice: Subject to any disclaimer, the term of this patent is extended or adjusted under 35 U.S.C. 154(b) by 66 days.

(21) Appl. No.: 10/047,480

(22) Filed: Oct. 26, 2001

(65) Prior Publication Data

US 2002/0112583 A1 Aug. 22, 2002

(30) Foreign Application Priority Data

Oct. 26, 2000 (CN) ...................................... 00262660 U

(51) Int. Cl.⁷ ............................ A23N 1/02; A47J 43/06; B02C 18/18; B02C 25/00

(52) U.S. Cl. ............................ 99/492; 99/495; 99/484; 99/506; 99/508; 99/510; 99/537; 241/37.5; 241/92

(58) Field of Search .......................... 99/492, 495, 484, 99/501–513, 537–544, 623–631; 241/37.5, 68, 92, 93, 282.1, 282.2, 199.12, 101.1, 101.2, 285.1, 280, 100, 166, 169, 273.1, 285.2; 83/355, 356.3, 592, 326, 423, 932, 435.2, 167, 168

(56) References Cited

U.S. PATENT DOCUMENTS

| | | | | | |
|---|---|---|---|---|---|
| 4,198,887 | A | * | 4/1980 | Williams, Jr. | 83/592 X |
| 4,227,655 | A | * | 10/1980 | Williams | 241/92 |
| 4,277,995 | A | * | 7/1981 | Sontheimer | 83/592 X |
| 4,283,979 | A | * | 8/1981 | Roakocy | 241/92 X |
| 4,331,300 | A | * | 5/1982 | Hicks et al. | 241/282.1 |
| 4,369,680 | A | * | 1/1983 | Williams | 99/510 X |
| 4,393,737 | A | * | 7/1983 | Shibata | 241/282.2 X |
| 4,448,100 | A | * | 5/1984 | Breeden | 241/92 X |
| 4,700,901 | A | * | 10/1987 | McClean | 241/282.1 |
| 4,706,896 | A | * | 11/1987 | Moon-Kau | 241/37.5 |
| 4,768,429 | A | * | 9/1988 | Federighi | 99/623 X |
| 4,840,119 | A | * | 6/1989 | Caldi | 99/513 X |
| 5,435,237 | A | * | 7/1995 | Huang | 99/510 |

* cited by examiner

*Primary Examiner*—Timothy F. Simone
(74) *Attorney, Agent, or Firm*—Kenyon & Kenyon

(57) ABSTRACT

A food processing device comprising a body, a container removably accommodated by said body and food processing means supported on said body above said container, whereby solids and/or liquids resulting from the processing of food by the food processing means fall into the container, whereby the food processing means include food slicing means, mounted on the body so as to be held stationary relative thereto, and first and second food holding means, mounted on the body for movement relative thereto so as to bring food held thereby into slicing contact with said food slicing means, wherein said first food holding means comprise a slidable food support element mounted on said body for sliding motion relative thereto, and a hand guard, mountable on said food support element such that food held between the food support element and the hand guard may be urged downwardly during the sliding motion without exposing the hand of the operator to contact with the food slicing means, whereby on sliding of said slidable food support element relative to the food slicing means the food held thereby is sliced by the food slicing means, and wherein said second food holding means comprise a rotatable food support element mounted on said body for rotation relative thereto whereby on rotation of rotatable food support element food held thereby is sliced by said food slicing means.

7 Claims, 3 Drawing Sheets

FOOD PROCESSING DEVICE

FIELD OF INVENTION

This invention relates to food processing devices, particularly to food processing devices to slice food and more particularly to food processing devices that are able to slice and squeeze liquid from food.

BACKGROUND TO THE INVENTION

Conventional slicing appliances require the user or include means to hold the food in a stationary position so that the food is sliced when the user moves a slicing blade across the food. Such devices require much effort and concentration to use safely and so are tiring when used over a continuous period of time.

STATEMENT OF INVENTION

According to the present invention there is provided a food processing device comprising a body, a container removably accommodated by said body and food processing means supported on said body above said container, whereby solids and/or liquids resulting from the processing of food by the food processing means fall into the container, whereby the food processing means include food slicing means, mounted on the body so as to be held stationary relative thereto, and first and second food holding means, mounted on the body for movement relative thereto so as to bring food held thereby into slicing contact with said food slicing means, wherein said first food holding means comprise a slidable food support element, mounted on said body for sliding motion relative thereto, and a hand guard, mountable on said food support element such that food held between the food support element and the hand guard may be urged downwardly during the sliding motion without exposing the hand of the operator to contact with the food slicing means, whereby on sliding of said slidable food support element relative to the food slicing means the food held thereby is sliced by the food slicing means, and wherein said second food holding means comprise a rotatable food support element mounted on said body for rotation relative thereto whereby on rotation of rotatable food support element food held thereby is sliced by said food slicing means.

Preferably the food processing device further includes a food squeezing means mountable on said slidable food support element.

Preferably, the rotatable support element comprises means for securing said food to prevent relative movement therebetween and the securing means having a turning handle connected thereto and mounted for rotation on and relative to a support arm extending from said body.

Preferably, the said securing means include a food engaging element and a rod extending from the food engaging element to the handle whereby said rod and handle are provided with mating screw threads.

Preferably, the said body has upper and lower plates and the container is accommodated therebetween, also the said plates are interconnected by a hollow vertical part defining a cruciform hole and the said support arm has extending therefrom a cruciform finger located within said cruciform hole for sliding movement relative thereto.

Preferably, the cruciform finger comprises a first cruciform section located within said cruciform hole and a second larger cruciform section located above said hole such that the downward movement of the said finger within the hole is limited.

Preferably, the food slicing means are provided with positioning means in the form of a cone.

BRIEF DESCRIPTION OF THE DRAWINGS

An embodiment of the present invention is illustrated in the accompanying drawings, by way of example only, in which.

DETAILED DESCRIPTION OF THE INVENTION

Figure 1:
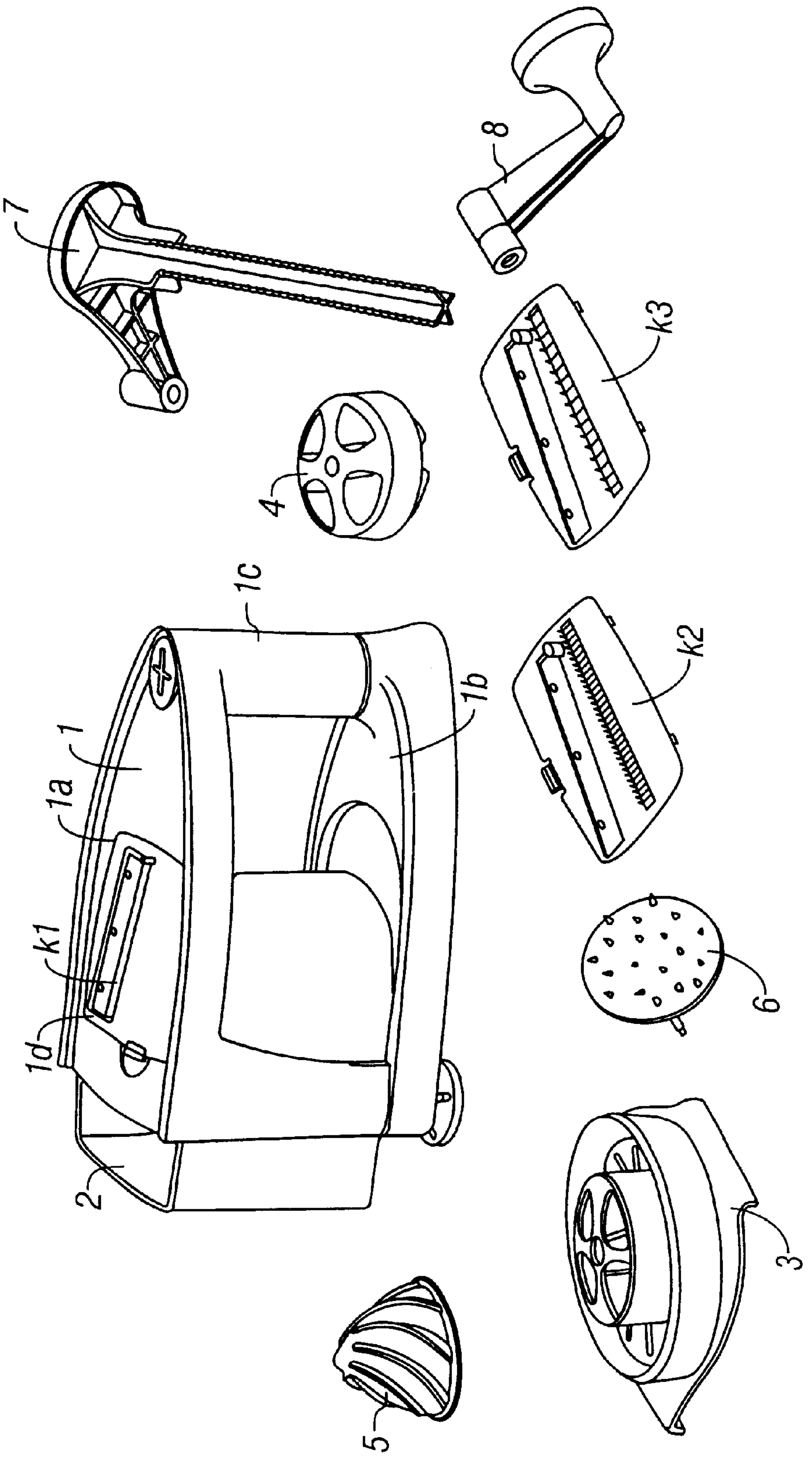
FIG. 1 is an exploded perspective view of all the parts of the food processing device in accordance with the present invention.

FIG. 1 of the accompanying drawings depicts all the requisite parts of the multipurpose food processing device to slice or squeeze food according to the present invention. The food processing device comprises a body 1 which is formed from an upper plate 1*a,* lower plate 1*b* and hollow vertical post 1*c*. The hollow vertical post 1*c* is arranged at one end between the upper 1*a* and lower plates 1*b* and acts as a supporting member. The upper plate 1*a* of the main body is provided with a recess space 1*d* and shaped to accommodate a cutting blade. Various cutting blades may be used to process the food, for example cutting blade K1, slicing blade K2 and slicing blade K3 for processing a filament of food. A removable food container 2 is placed beneath the cutting blade in-between the upper 1*a* and lower plates 1*b*. The food container 2 is positioned to collect the food as it is sliced and/or collect liquid as the food is squeezed. Food engaging element 6, handle 8 and support arm 7 are connected together and mounted on the body when the food processing device is used to slice food in a rotating motion. Whereas slidable food support element 3 is mounted on the body when the device is used to slice food in a sliding motion. A hand guard 4 is attached to the slidable food support element 3 to protect the hands of the user. Squeezing means 5 are mountable on the slidable food support element 3 and are shaped to enable juices to be squeezed from food.

Figure 4:
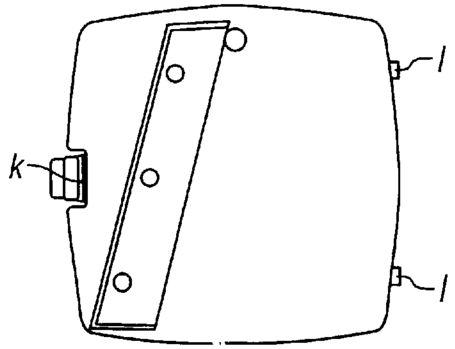
FIG. 4 is a plan view of a cutting blade of the food processing device of FIG. 1.
Figure 5:
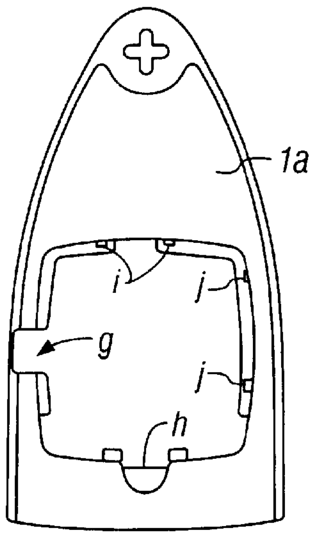
FIG. 5 is a plan view of the upper plate of the main body of the food processing device of FIG. 1.

FIG. 5 depicts the recess space 1*d* of the upper plate in more detail. The recess space 1*d* is configured to allow a cutting blade, as shown in FIG. 4, to be positioned in one of two directions depending on whether the food is to be sliced in a sliding motion or rotating motion relative to the main body. If the food is to be sliced in a rotating motion the cutting blade of FIG. 4 is arranged such that groove G receives buckle K and holes J receive elongate tabs L. In this particular case, positioning cone E of the cutting blade is located within the central region of the upper plate and under the food engaging element 6. The positioning cone E acts as a stop and helps to position the food engaging element 6 so that the food is always positioned adjacent the cutting edge of the cutting blade. In this case groove H is useful in helping the user of the food processing device to fix or lift and release a cutting blade from the body 1. If the food is to be sliced in a sliding motion then groove H receives buckle K and holes I receive elongate tabs L. As a result, positioning cone E is now located close to the outer edge of the upper plate 1*a* of the body 1 and acts as a stop to position food within the cutting blade region. Groove G enables the user of the food processing device to help fix or lift and release a cutting blade from the body 1.

Figure 2:
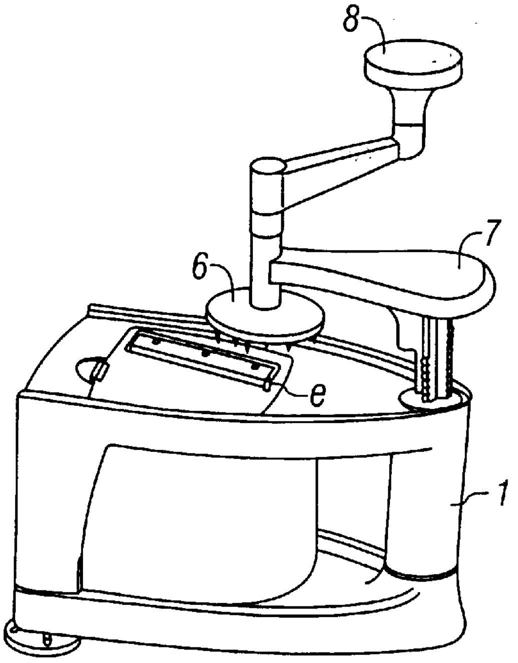
FIG. 2 is a perspective view of the food processing device of FIG. 1, in a first assembled state, where the device is arranged to slice food in a rotating motion.
Figure 3:
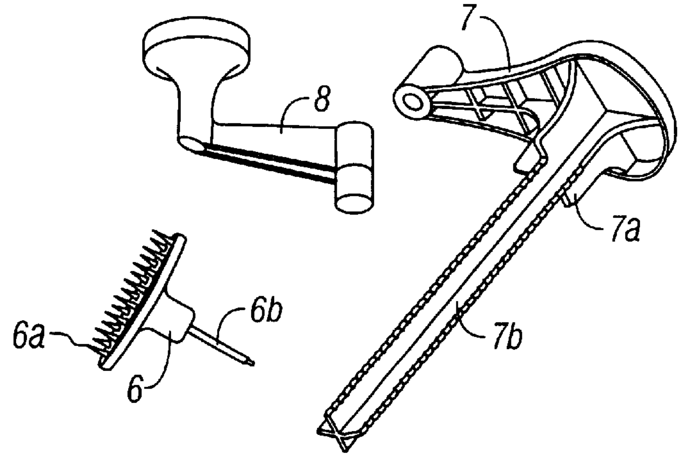
FIG. 3 is an exploded perspective view of the means to enable food to be sliced in a rotating motion according to the arrangement shown in FIG. 2.

FIG. 2 depicts the first arrangement of the device of the present invention which includes means to slice food in a rotating motion relative to the body 1. FIG. 3 shows the separate parts of the means to enable the food to be sliced in such a way. A cutting blade is fixed in place on the upper plate 1*a* of the body 1 such that the positioning cone E is located in the centre of the upper plate 1*a* and underneath the food engaging element 6. The food engaging element 6 includes a plurality of spikes 6*a* to pierce food and engage it and also a linking rod 6*b* provided with male screw threads at one end. The handle 8 is provided with corresponding female screw threads. FIG. 2 shows how the food engaging element 6 and handle 8 are mounted on the support arm 7 which is in turn mounted on the body 1 of the processing device. Support arm 7 is provided with a hole such that the linking rod 6*b* can pass through to allow the male screw threads to engage with the female screw threads of the handle 8. As a result, the food engaging element 6, and handle 8 are connected together so that the food engaging means are rotated by the turning of the handle 8 and rotate relative to the support arm 7. In the present arrangement of the invention the vertical post 1*c* of the main body is provided with a cruciform shaped hole. An elongate cruciform finger extending from the support arm 7 is formed to fit within the hole in a sliding motion so that the support arm 7 is mounted on the body of the food processing device. The cross-section of the cruciform shaped finger varies such that the first section 7*b* may be inserted easily into the vertical post hole but the second larger cruciform section 7*a* is located above the hole in order to limit the downward movement of the finger. Accordingly, the food engaging element 6 is positioned just above the cutting blade such that food, held in place by the food fixing means 6, is sliced as the handle 8 is turned. The sliced food then drops into the food container 2 beneath the cutting blade. By adjusting the height of support arm 7 the cutting blade set in the upper plate 1*a* of the body 1 either slices or cuts food.

Figure 6:
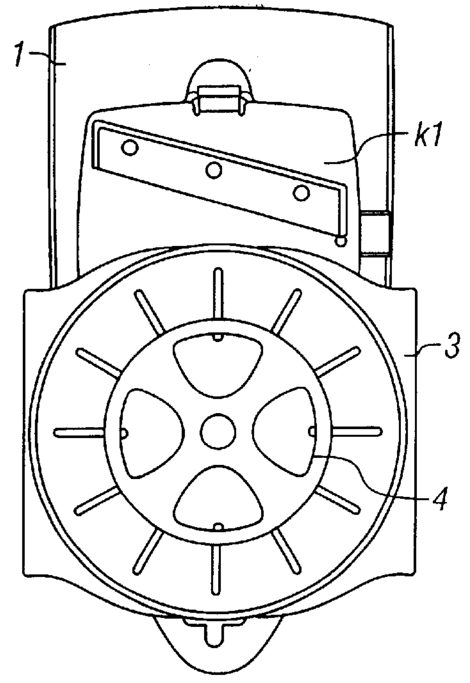
FIG. 6 is a plan view of a second arrangement of the food processing device of FIG. 1, in an assembled state, where the device is arranged to slice food in a sliding motion.
Figure 7:
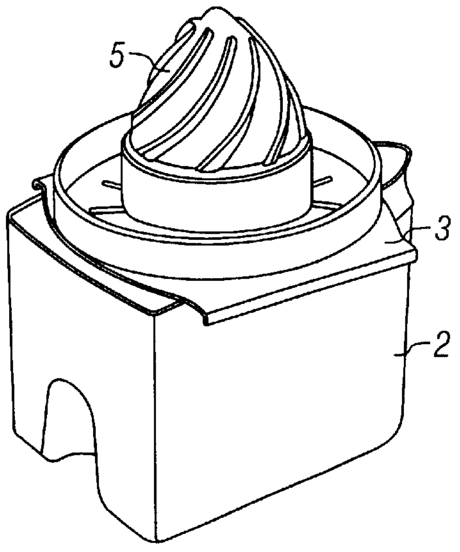
FIG. 7 is a perspective view of a third arrangement of the food processing device of FIG. 1, in an assembled state, where squeezing means are arranged to squeeze liquid from food.

FIG. 6 depicts the second arrangement of the device of the present invention which includes means to slice food in a sliding motion relative to the main body 1. A slidable food support element 3 is attached to the upper plate 1*a* and positioned above the cutting blade. The slidable food support element 3 is attached so that is it able to slide along the upper plate 1*a* and over the cutting blade when an external force is applied. FIGS. 6 and 7 show how the flange edges of the element 3 bend around the body 1 and the width between the two flange edges is such that the elements can be placed around the body 1. In order to slice food using this particular arrangement of the present invention food is inserted into at least one guiding hole within the slidable food support element 3 to guide the food downwardly towards the upper plate 1*a,* then a hand guard 4 is attached to the slidable food support element 3 to push against the food inserted within the holes to urge it downwardly during the sliding motion. When the food is held in position it is sliced as the user applies a force to the slidable food element 3 so that it slides across the cutting blade in a to and fro motion. The sliced food then drops into the food container 2 beneath the cutting blade. As the food is sliced and the volume of food within the guiding holes decreases the hand guard 4 prevents the hands of the user from being in contact with the food slicing means.

FIG. 7 depicts the third arrangement of the device of the present invention which includes means to squeeze juice from food. The squeezing means 5 is attached to sliding plate 3 and shaped as a dome with outer protruding ridges. In order to release juices from the food the user must squeeze the food around the dome and force it against the ridges. This is usually achieved by twisting the food around the dome in a rapid motion. The liquid released runs through radial slots in the sliding plate (see FIG. 7) and is collected by the food container 2 below. In this particular case the upper plate 1*a* need not incorporate a cutting blade.

It should be appreciated that the above-described food processing device represents a preferred embodiment of the present invention. Various modifications may be made to this embodiment without departing from the scope of the present invention.

I claim:

1. A food processing device comprising a body, a container removably accommodated by said body and food processing means supported on said body above said container, whereby solids and/or liquids resulting from the processing of food by the food processing means fall into the container, whereby the food processing means include food slicing means, mounted on the body so as to be held stationary relative thereto, and first and second food holding means, mounted on the body for movement relative thereto so as to bring food held thereby into slicing contact with said food slicing means, wherein said first food holding means comprise a slidable food support element mounted on said body for sliding motion relative thereto, and a hand guard, mountable on said food support element such that food held between the food support element and the hand guard may be urged downwardly during the sliding motion without exposing the hand of the operator to contact with the food slicing means, whereby on sliding of said slidable food support element relative to the food slicing means the food held thereby is sliced by the food slicing means, and wherein said second food holding means comprise a rotatable food support element mounted on said body for rotation relative thereto whereby on rotation of rotatable food support element food held thereby is sliced by said food slicing means.

2. A food processing device according to claim 1 further including food squeezing means mountable on said slidable food support element.

3. A food processing device according to claim 1 wherein said rotatable support element comprises means for securing said food to prevent relative movement therebetween whereby the securing means have a turning handle connected thereto and are mounted for rotation on and relative to a support arm extending from said body.

4. A food processing device according to claim 3 wherein said securing means include a food engaging element and a rod extending from said food engaging element to said handle whereby said rod and handle are provided with mating screw threads.

5. A food processing device according to claim 3 wherein said body having upper and lower plates, said container being accommodated therebetween, said plates being interconnected by a hollow vertical part defining a cruciform hole and said support arm has extending therefrom a cruciform finger located within said cruciform hole for sliding movement relative thereto.

6. A food processing device according to claim 5 wherein said cruciform finger comprises a first cruciform section located within said cruciform hole and a second larger cruciform section located above said hole and limiting downward movement of said finger within said hole.

7. A food processing device according to claim 1 wherein the food slicing means are provided with positioning means in the form of a cone.

* * * * *